United States Patent Office 3,176,518
Patented Apr. 6, 1965

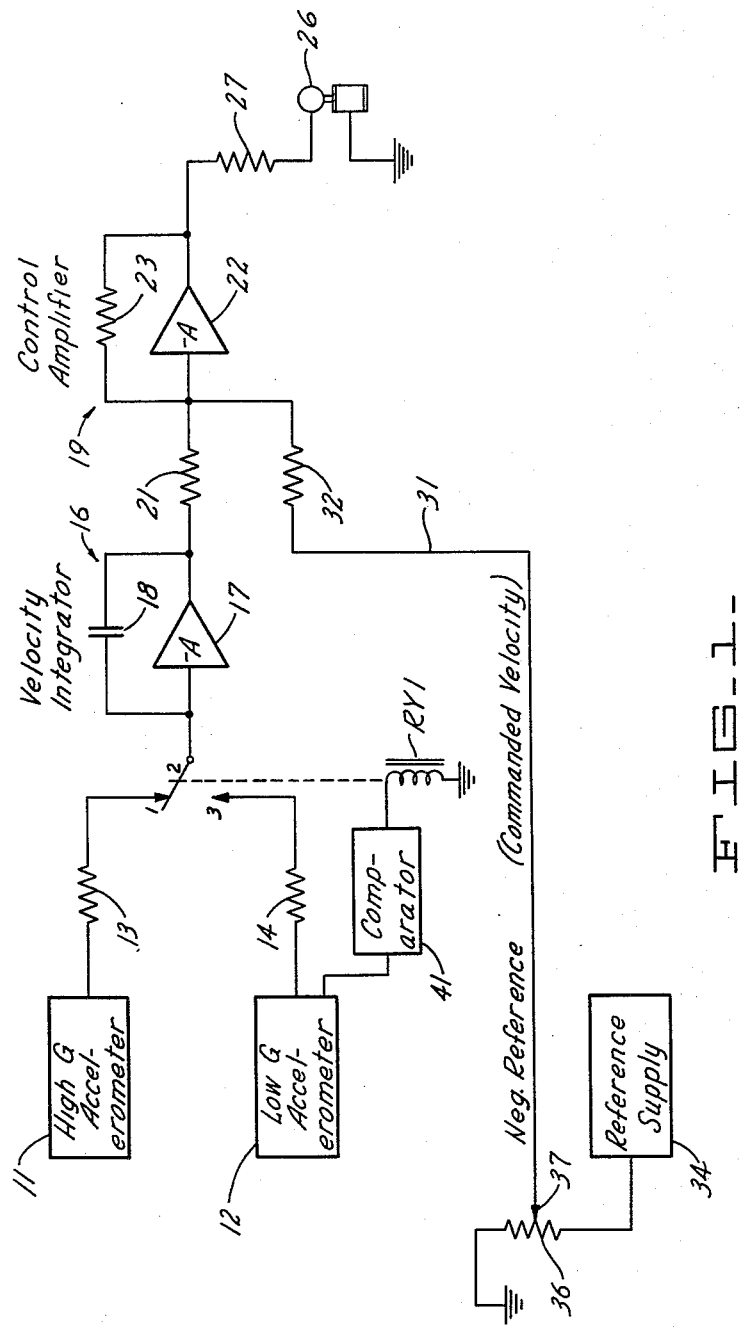

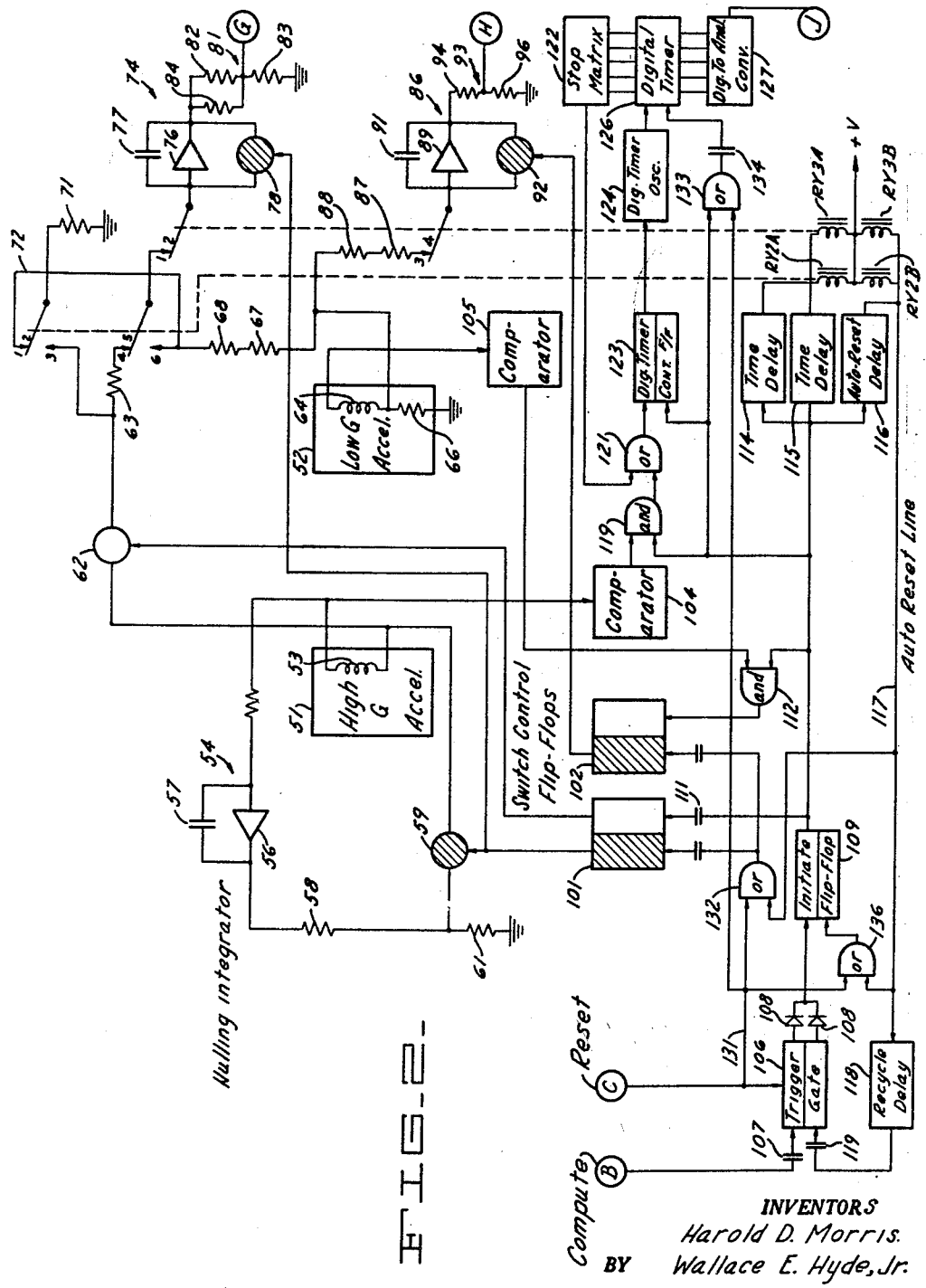

3,176,518
DUAL ACCELERATION RANGE INTEGRATING
ACCELEROMETER
Harold D. Morris, Orinda, and Wallace E. Hyde, Jr., Moraga, Calif., assignors to Systron-Donner Corporation, Concord, Calif., a corporation of California
Filed Aug. 24, 1961, Ser. No. 133,701
10 Claims. (Cl. 73—503)

This invention relates to an integrating accelerometer and more particularly to a dual acceleration range integrating accelerometer.

In certain missile applications, it is desirable to provide a separation monitor which is capable of sensing the additional velocity which is imparted to the missile after the flight programmer has terminated the thrust from the booster and separated the booster from the missile. In other missile applications, it is desirable to control the velocity of a missile in accordance with a predetermined command velocity so that the missile will arrive at the final landing point with optimum accuracy. Devices suitable for such a purpose have heretofore not been available, and for that reason there is a need for such devices.

In general, it is an object of the present invention to provide a dual acceleration range integrating accelerometer which will perform the functions set forth above.

Another object of the invention is to provide an integrating accelerometer of the above character which will measure the time between the command to terminate the thrust and the time the thrust is terminated and the velocity increment added during this period of powered flight.

Another object of the invention is to provide an integrating accelerometer of the above character which will measure the velocity increment added because of other forces.

Another object of the invention is to provide an integrating accelerometer of the above character in which high accuracy is obtainable.

Another object of the invention is to provide an integrating accelerometer of the above character which recycles itself.

Another object of the invention is to provide an integrating accelerometer of the above character which has very low switching times.

Another object of the invention is to provide an integrating accelerometer of the above character which has a digital memory.

Another object of the invention is to provide an integrating accelerometer of the above character which can be utilized for powering a missile at a commanded velocity.

Another object of the invention is to provide an integrating accelerometer of the above character in which a control signal is developed which indicates whether the missile is flying above or below the commanded velocity.

Another object of the invention is to provide an integrating accelerometer of the above character which is utilized for controlling the thrust applied to a missile.

Additional objects and features of the invention will appear from the following description in which the preferred embodiments are set forth in detail in conjunction with the accompanying drawings.

Referring to the drawings:

FIGURE 1 is a block diagram of a dual acceleration range integrating accelerometer incorporating our invention.

FIGURE 2 is a block diagram of another embodiment of our dual acceleration range integrating accelerometer.

In general, our dual range integrating accelerometer consists of a pair of accelerometers, one of which is used for measuring high trust and the other of which is used for measuring low thrust. Velocity integrating means is adapted to be connected to either of the accelerometers under the control of comparator means which senses when the thrust is within the range of one of the accelerometers.

In FIGURE 1, we have shown a block diagram of a dual acceleration range integrating accelerometer incorporating our invention which, a shown, consists of a high G accelerometer 11 and a low G accelerometer 12. The accelerometers 11 and 12 can be of any suitable type such as that disclosed in copending application Serial No. 794,487 filed February 4, 1959. The outputs of the accelerometers 11 and 12 are connected to contacts 1 and 3 of a relay RY1 through resistors 13 and 14. The movable contact 2 of the relay RY1 is connected to a velocity integrator 16 which consists of an amplifier 17 and an integrating capacitor 18 connected across the input and output terminals of the amplifier. The output of the velocity integrator is connected to a control amplifier 19 through a resistor 21. The control amplifier consists of an amplifier 22 and a feedback resistor 23 connected between the input and output terminals of the amplifier. The output of the control amplifier 19 is connected to an electrically operated hydraulic control valve 26 through a resistor 27.

The control amplifier is provided with a negative reference from a command line 31 which is connected to the amplifier through a resistor 32. The reference is supplied to the command line 31 from a reference supply 34 which is connected through a potentiometer 36 to ground. The wiper 37 of the potentiometer is connected to the command line and makes it possible to apply a reference of different values to the command line to provide a command velocity as hereinafter described.

Means is provided for automatically transferring from the high G accelerometer to the low G accelerometer when the thrust or acceleration comes within the range of the low G accelerometer and consists of a comparator which senses when the low G accelerometer comes out of saturation and operates relay RY1 at this time.

Operation of the dual acceleration range integrating accelerometer shown in FIGURE 1 may now be briefly described. Let it be assumed that the integrating accelerometer shown in FIGURE 1 is to be used as a zoning unit for a small missile. Also let it be assumed that the missile is of a type which has a sustainer engine as well as a main booster engine and that the control device is a control valve for operating the sustainer engine. Also let it be assumed that it is desired that the missile fly on a vacuum trajectory, that is, assuming that there is no air. This is accomplished by adjusting the thrust of the engine so that it is equal to the drag of the air on the nose of the missile. The vacuum trajectory determines the range of the missile and makes it possible to determine the landing place of the missile very accurately.

Upon firing of the missile, the high G accelerometer 11 measures the main thrust of the booster which may be very high, as for example, 80 G's. This measured thrust is applied through the contacst 1 and 2 of the relay RY1 to the velocity integrator 16. As the booster for the missile burns out, the acceleration of the missile decreases and finally reaches a value at which the saturation sensing comparator 41 operates the relay RY1 to close contacts 2 and 3. This low G accelerometer can measure any suitable value of acceleration, as for example, acceleration from zero to 3 G. This acceleration information from the low G accelerometer 12 is also applied to the velocity integrator and is supplied to the control amplier 19 to operate the control device 26 in accordance with the command which is applied to the control amplifier 19.

The command velocity which is applied to the control amplifier 19 is calculated in such a manner that it represents the true velocity of the missile excluding the effect of gravity. Thus, the command signal on the line 31 is a reference which is proportional to the command velocity. An error signal is generated by the control amplifier 19 which is determined by the difference between the signal applied to the control amplifier 19 from the velocity integrator 16 and the signal applied on the line 31 to control the valve 26. This valve, in turn, regulates the sustainer engine to cause the missile to fly at the commanded velocity throughout its entire flight.

Although not shown, the control amplifier 19 is provided with means to prevent saturation during the first interval of flight when the missile is below the desired velocity. This is a voltage operated resistor which is represented by the resistor 23. If it is desired to provide damping for the system, an acceleration signal can be fed directly from a resistor (not shown) in series with the capacitor 18 of the velocity integrator to provide stable overall operation. The system shown is a closed loop servo from the engine to the accelerometer which senses the engine thrust through the integrator reading velocity to the control amplifier back to the hydraulic valve 26 controlling the engine.

Another embodiment of our invention is shown in FIGURE 2 and consists of a high G accelerometer 51 and low G accelerometer 52. The accelerometers 51 and 52 can be of a suitable type such as the Model 4310 accelerometer manufactured by the Donner Scientific Division of Systron-Donner Corp. The accelerometers may have any suitable range. For example, the high G accelerometer can have a range of ± 40 G whereas the low G accelerometer can have a range of ±1 G. The high C accelerometer 51 is provided with a nulling circuit which is necessary to obtain the proper transient response from the high G accelerometer. This nulling circuit or loop consists of the windings 53 of the accelerometer which is connected to a nulling integrator 54 consisting of an amplifier 56 and an integrating capacitor 57. The nulling integrator is connected through a resistor 58 to a normally closed (indicated by the cross sectioning) switch 59 to the other side of the winding 53 to provide a closed loop. This nulling loop serves to suppress the output of the high G accelerometer to zero prior to when the thrust termination is received. The nulling loop is connected to ground through a resistor 61 which serves as load resistor.

The output of the high G accelerometer is connected to another normally open electronic switch 62 which is connected to contact 3 of relay RY2.

The low G accelerometer 52 is provided with a winding 64, one end of which is connected to ground through a resistor 66. The same end of the winding 64 is connected to contact 6 of relay RY2 through resistor 67 and trim resistor 68. Movable contact 2 of relay RY2 is connected to ground through a load resistor 71. As hereinafter explained this resistor 71 serves as an alternate load for the high G accelerometer. Stationary contacts 1 and 6 of relay RY2 are interconnected by conductor 72. Movable contact 5 of relay RY2 is connected through contacts 1 and 2 of relay RY3 to a total information integrator 74. The total information integrator consists of an amplifier 76 and an integrating capacitor 77. The operation of the total information integrator is controlled by a normally closed electronic switch 78. The output of the total information integrator is supplied to a voltage divider network which supplies information to terminal G to provide total information in a suitable quantity such as feet per second. In a similar manner, the low G accelerometer is connected to a tailing information integrator 86 through contacts 3 and 4 of relay RY3 and through resistors 87 and 88 to one end of the winding 64 of the accelerometer 52. The voltage divider network 81 consists of resistors 82 and 83 and a trim resistor 84.

The tailing information integrator 86 consists of an amplifier 89 and an integrating capacitor 91. A normally closed electronic switch 92 is provided for controlling the operation of the integrator 86. The output of the integrator is supplied to voltage divider network 93 consisting of resistors 94 and 96. The output from the voltage divider is supplied to terminal H in the form of tailing information in a suitable quantity as feet per second.

The electronic switch 59 and the electronic switch 78 are controlled by a switch control flip-flop or bistable circuit 101 and are connected to the bistable circuit 101 as shown. The other side of the switch control flip-flop 101 is connected to the normally open electronic switch 62. Another switch control flip-flop 102 is provided for controlling the electronic switch 92. The switch control flip-flops 101 and 102 are provided with two sides and one side is cross-sectioned to show which side is normally on. The electronic switches are cross-sectioned to indicate a normally closed position and are left blank to indicate a normally open position.

The output of the high G accelerometer 51 is connected to a comparator 104 which is provided for the purpose of determining when the acceleration drops a predetermined acceleration range. The low G accelerometer 52 has its output also connected to a comparator 105 which is used for determining when the thrust being measured by the low G accelerometer comes within the acceleration range of the low G accelerometer.

A control and timing circuit is provided which includes a trigger gate 106 to which the terminal B is connected through a D.-C. blocking capacitor 107. The compute commands are supplied to the B terminal to commence the operation of the circuitry as hereinafter described. The trigger gate 106 is a conventional bistable circuit and has its output applied to a pair of diodes 108 which serve the purpose of isolating and selecting the positive-going transient from each change of state of the bistable circuit. The common output from the diodes 108 is connected to an initiate flip-flop 109 which holds the compute command as hereinafter described. The output of the initiate flip-flop is connected to the switch control flip-flop 101 through a coupling capacitor 111. It is also connected to one input of an AND gate 112. The other input of the AND gate is connected to the comparator 105. The output of the AND gate 112 is connected to one side of the switch control flip-flop 102. The initiate flip-flop 109 is also connected to three time delay devices 114, 115 and 116. Each is set up after a predetermined time interval, as for example, time delay device 114 can be set to operate after .05 second, time delay device 115 after 2.5 seconds, and automatic reset delay device after 22.5 seconds. The output of the time delay device 114 is connected to relay RY2 which is provided with two windings RY2A and RY2B. Time delay device 115 is connected to the windings RY3A and RY3B of the relay RY3. Time delay device 116 is connected to an automatic reset line 117 which is connected to a recycle delay device 118 which is connected through a coupling capacitor 119 to the trigger gate 106.

The initiate flip-flop 109 is also connected to one of the inputs of an AND gate 119. The other input of the AND gate 119 is connected to the comparator 104. The output of the AND gate 119 is connected to one input of an OR gate 121. The other input of the OR gate is connected to a stop matrix 122. The output of the OR gate 121 is connected to a digital timer control flip-flop 123. The digital timer control flip-flop also has its input directly connected to the initiate flip-flop 109. The output of the digital timer control flip-flop 123 is connected to a digital timer oscillator 124 which is connected to a digital timer 126. The stop matrix 122 is connected to the digital timer 126. The digital timer 126 is connected to a digital to analog converter 127. The output of the digital to analog converter is supplied to an output terminal J.

Means is provided for resetting the circuitry when the reset command is applied to the reset terminal C and consists of a reset line 131 which is connected to the trigger gate 106 and to one of the inputs of an OR gate 132. The other input of the OR gate 132 is connected to the reset line 117. The output of the OR gate 132 is connected to the switch control flip-flops 101 and 102. The reset line 131 is also connected to another OR gate 133 and the other input of the OR gate 133 is connected to the initiate flip-flop 109. The output of the OR gate 133 is connected through a coupling capacitor 134 to the digital timer 126.

Operation of the circuitry of the block diagram shown in FIGURE 2 may now be briefly described as follows. Let it be assumed that the circuitry shown in the block diagram is being utilized as a separation monitor to sense the additional velocity which is imparted to a missile after the flight program computer had entered a command to terminate the thrust of the main booster being utilized.

Upon receipt of the thrust termination command from the guidance computer at the terminal B, the bistable circuit 106 will flip to produce an output which, in turn, will cause the bistable circuit 109 to flip. This will cause operation of the switch control flip-flop 101.

When the switch control flip-flop 101 operates, it opens the normally closed electronic switch 59 to disconnect the nulling integrator from the high G accelerometer 51. At the same time, the electronic switch 62 is closed by the operation of the switch control flip-flop 101 so that the output from the high G accelerometer is applied to the total information integrator 74. It should be pointed out that the load resistor 61 is equal to the input resistor 63. Resistor 71 for the high G accelerometer is equal to the input resistor 63 and the load resistor 61. At the same time that the electronic switch 62 is closed, the switch 78 is opened to permit operation of the total information integrator 74. Thus, at time zero, when the thrust termination command arrives, the output from the high G accelerometer 51 is applied to the total information integrator 74 to determine the amount of velocity added to the missile during the time between the command to terminate thrust and the time when the thrust termination of the main booster engine actually becomes effective.

From the foregoing, it will be seen that the total information integrator 74 will record the total velocity increment applied to the missile after time zero until the final termination of integration at a predetermined time interval, that is, for example, 2½ seconds later. However, the circuitry is arranged in such a manner that the total information integrator will only receive information from the high G accelerometer for a predetermined period of time, as for example, 50 milliseconds, after which the time delay circuit 114 causes energization of relay RY2 to switch the input terminal of the total information integrator 74 to the low G accelerometer 52. This is done because the low G accelerometer has less drift and zero uncertainty and is, therefore, more suitable for measuring low levels of acceleration which will normally occur at this time. Thereafter, the acceleration measured by the low G accelerometer is applied to the total information integrator 74.

When the total thrust being measured by the high G accelerometer decreases below a predetermined value, as for example, 0.95 G, the comparator 104 supplies a signal to the AND gate 119. Assuming there is a signal from the initiate flip-flop 109, there will be an output from the AND gate 109 to the OR gate 121 to cause operation of the digital timer control flip-flop 123 to stop the operation of the digital timer oscillator 124 which was started by the compute command transmitted through gate 106 and initiate flip-flop 109 to prevent it from supplying clock pulses to the digital timer 126. This serves as a measure of the time delay between the time the flight program computer commands a thrust termination and the time that the command actually was made effective by the thrust dropping down below the thrust for which the comparator 104 is set.

When the low G accelerometer 52 comes out of saturation, the comparator 105 is operated to supply a signal to the AND gate 112. Assuming that there is a signal from the initiate flip-flop 109, the switch control flip-flop 102 will be operated to open the normally closed electronic switch 92 to permit operation of the tailing information integrator 86 to thereby permit this integrator to record the velocity increment.

Electronic switches in the form of semiconductor devices are utilized in this application because it is undesirable to lose any velocity information during the switching. For that reason, relays normally would not be satisfactory for such high speed operation.

After the end of the time interval for which the time delay device 115 is set, the relay RY3 is energized to open its contacts to prevent the application of additional information to the integrators 74 and 86. Thus, after the time delay device 115 is set, no more information is applied to the integrators 74 and 86.

In summary, it can be seen that the total information integrator 74 records the total additional velocity applied to the missile after receipt of the command to terminate thrust. The tailing information integrator supplies the velocity increment applied to the missile object after the acceleration has dropped below a predetermined value, as for example, below 1 G. The timing circuitry which includes the stop matrix 122, the digital timer 126 and the digital analog converter 127 records the time delay from the initiate to the cessation of thrust and to remember it for a predetermined period, as for example, 20 seconds. Since the ratio of record time to the integrating or record time is relatively large, a digital system is used for accurate measurement of time and is held in a digital form. The other outputs are held in an analog form.

It is apparent from the foregoing that we have provided a dual acceleration range integrating accelerometer which has many applications. It is relatively simple and inexpensive to manufacture.

We claim:

1. In a dual acceleration range integrating accelerometer, a first accelerometer having a relatively high acceleration range, a second accelerometer having a relatively low acceleration range, a nulling loop connected to said first accelerometer to maintain the output at null until a predetermined time interval elapses, integrating means, comparator means connected to one of said accelerometers for determining when the acceleration being measured is within the range of said one accelerometer and switching means connected to said comparator means and operated by said comparator means for applying the output of one of said accelerometers to said integrating means.

2. In a dual acceleration range integrating accelerometer for controlling a sustainer engine on a missile, a first accelerometer having a relatively high acceleration range, a second accelerometer having a relatively low acceleration range, an integrator, switch means connecting the first and second accelerometers to the integrator, means for determining when the acceleration being measured comes within the range of the second accelerometer to operate said switching means to disconnect the first accelerometer from the integrator and connect the second accelerometer to the integrator, a control amplifier connected to the output of the integrator, means for supplying a negative reference to the input of the control amplifier and control means connected to the output of the control amplifier for controlling the sustainer engine to maintain a substantially constant command velocity for the remainder of the flight as determined by the control amplifier.

3. In a dual acceleration range integrating accelerometer, a first accelerometer having a relatively high acceleration range, a second accelerometer having a relatively low acceleration range, a total information integrator, a partial information integrator, switch means connecting the first and second accelerometers to the total information integrator, switch means connecting the second accelerometer to the partial information integrator, means for nulling the output of the first accelerometer before receipt of a compute command, each of said integrators including switch means for preventing operation of the same, means for operating the switch means of the total information integrator so that the total information integrator commences to operate upon the receipt of the compute command, time delay means connected to said switch means connected to said first and second accelerometers for programming the operation of the same, said time delay means commencing operation upon receipt of the compute command, and means for sensing when the acceleration being measured comes within the range of the second accelerometer for commencing operation of said partial integrator.

4. An accelerometer as in claim 3 wherein said switch means connected to the first and second accelerometers includes a pair of relays, wherein said time delay means includes at least a pair of time delay devices and wherein the first time delay device determines the period of time during which the first accelerometer measures acceleration and the second time delay device determines the period of time during which the second accelerometer measures acceleration.

5. An accelerometer as in claim 3 together with time measuring means for measuring the time between the receipt of the compute command and the time acceleration falls below a predetermined level.

6. An accelerometer as in claim 5 wherein said time measuring means includes a digital timer, a digital timer oscillator connected to a digital timer, a digital timer control flip-flop connected to the digital timer oscillator and a digital-to-analog converter connected to the digital timer.

7. In a dual acceleration range integrating accelerometer, a first accelerometer having a relatively high acceleration range, a second accelerometer having a relatively low acceleration range, integrator means, switching means for selectively connecting said first and second accelerometers to said integrating means, and means connected to said switching means for sensing when the acceleration being measured comes within the range of the second accelerometer for operating said switching means to disconnect said first accelerometer from said integrator means and to connect said second accelerometer to said integrator means, said integrator means consisting of a total information integrator adapted to be connected by said switching means to said first accelerometer and a partial information integrator adapted to be connected to said second accelerometer by said switching means.

8. An accelerometer as in claim 2 together with means to prevent saturation of the control amplifier during the first interval of flight when the missile is below the desired velocity.

9. In apparatus of the character described, an accelerometer having a pendulous mass and an analog output, a nulling loop connected to the electrical output of the accelerometer for maintaining the pendulous mass of the accelerometer continuously at its electrical null for a predetermined period of time, said nulling loop including switch means capable of assuming open and closed conditions, and means for controlling the operation of said switch means.

10. Apparatus as in claim 9 wherein said nulling loop includes an integrator.

References Cited by the Examiner
UNITED STATES PATENTS

| | | | |
|---|---|---|---|
| 2,207,908 | 7/40 | Beecher | 73—197 |
| 2,603,726 | 7/52 | McLean | 73—503 |
| 2,613,071 | 10/52 | Hansel | 73—490 |
| 2,943,393 | 7/60 | Bosch | 73—516 |
| 2,970,479 | 2/61 | Wikstrom | 73—514 |
| 2,980,894 | 4/61 | Lindemann | 73—197 |
| 3,073,550 | 1/63 | Young | 244—14 |

FOREIGN PATENTS 779,156 7/57 Great Britain.

RICHARD C. QUEISSER, *Primary Examiner.*

S. LEVINE, ROBERT L. EVANS, JAMES J. GILL,
*Examiners.*